3,282,956
TRANS-4-PROPYL-L-HYGRIC ACID AND DERIVATIVES
Ross R. Herr, Kalamazoo, and William Schroeder, Pavilion Township, Kalamazoo County, Mich., assignors to The Upjohn Company, a corporation of Delaware
No Drawing. Filed Apr. 13, 1964, Ser. No. 359,449
8 Claims. (Cl. 260—326.3)

This invention relates to novel compositions of matter and to processes for the preparation thereof, and is particularly directed to trans-4-propyl-L-hygric acid (I, R=H), a novel α-amino acid, to esters and salts thereof, including quaternary ammonium salts, and to a process for producing the same.

The novel compounds of this invention can be illustratively represented by the following formulae:

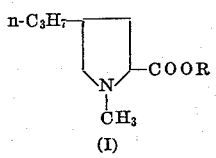 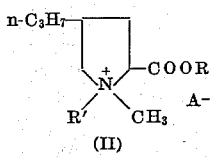

wherein R and R′ are selected from the group consisting of hydrogen and alkyl, e.g., methyl, ethyl, propyl, butyl, amyl, hexyl, heptyl, octyl, lauryl, pentadecyl, octadecyl and the like and the isomeric forms thereof, and wherein A⁻ is an anion selected from the group consisting of monovalent organic and inorganic anions, e.g., chloride, bromide, iodide, bisulfate, acetate, propionate, lactate, and the like.

The novel trans-4-propyl-L-hygric acid (I, R=H) is one specific isomeric form of four possible 4-propylhygric acids and can be represented by the following steric configuration (III):

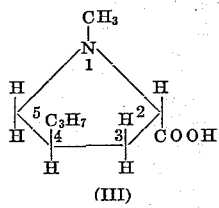

Being an α-amino acid, the compound of the invention is perhaps more accurately represented as the dipolar ion or zwitterion, shown below as IIIz, which in acid solution is inverted to the cationic form (IIIc) and in alkaline solution to the anionic form (IIIa).

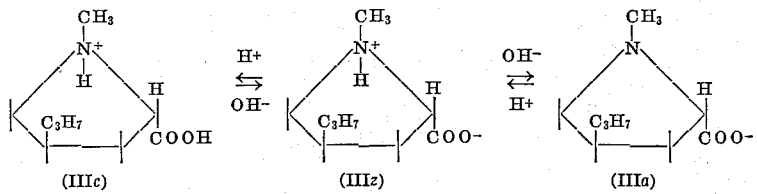 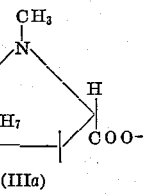

Trans-4-propyl-L-hygric acid is obtained as a degradation product of the antibiotic lincomycin, which is an elaboration product of a lincomycin-producing actinomycete. Methods for the production, recovery and purification of linomycin are described in U.S. Patent 3,086,912.

Trans-4-propyl-L-hygric acid according to the invention is obtained by contacting lincomycin, either in the form of the free base or in the form of an acid addition salt, with an acid, e.g., a strong mineral acid such as hydrochloric, hydrobromic, hydroiodic, sulfuric, phosphoric, and the like. Preferably, hydrochloric acid is used as the hydrolyzing agent and when so used the trans-4-propyl-L-hygric acid is isolated as the hydrochloride (IIIa). When the other acids listed above are used for hydrolysis, the product is isolated as the corresponding acid addition salt. The 4-propyl-L-hygric acid addition salt can be converted to the zwitterion (IIIz) of trans-4-propyl-L-hygric acid by treatment with a base, e.g., silver carbonate, or a basic anion exchange resin.

Lincomycin is hydrolyzed in strong aqueous acid at a normality between 1 and 10, but greater or lesser concentrations are operative. The reaction is usually conducted between about 10° C. and the reflux temperature of the mixture, with reflux temperatures preferred.

The novel compound of the invention, trans-4-propyl-L-hygric acid can also be made by reacting lincomycin, as a free base or as an acid addition salt, with hydrazine, advantageously as the hydrate, until substantial hydrazinolysis is obtained and hydrolyzing the thus-produced hydrazide with a mineral acid. The hydrazinolysis takes place at room temperature (25–35° C.) but higher or lower temperatures from about 0 to 130° C. can be used. The proportions of lincomycin and hydrazine can be varied but at least the stoichiometric amount of hydrazine is necessary to effect complete hydrazinolysis. Advantageously, an excess of hydrazine is used as a solvent for the reaction.

The novel trans-4-propyl-L-hygric acid forms stable protonates (acid addition salts) on neutralization with suitable acids, for example, hydrochloric, hydrobromic, sulfuric, phosphoric, nitric, thiocyanic, acetic, benzoic, salicyclic, glycolic, succinic, tartaric, maleic, malic, lactic, methane-sulfonic, cyclohexanesulfamic, and the like.

The invention also embodies the formation of various metal and ammonium salts, for example, those obtained when trans-4-propyl-L-hygric acid is treated with an alkali metal hydroxide, an alkaline earth metal hydroxide, ammonia or an amine, such as mono-, di-, and trimethylamine. For example, when one equivalent of metal hydroxide such as sodium hydroxide, potassium hydroxide, calcium hydroxide, or the like, is treated with trans-4-propyl-L-hygric acid, the corresponding sodium, potassium, calcium, or the like, salt of trans-4-propyl-L-hygric acid is obtained.

Ammonium salts of trans-4-propyl-L-hygric acid are obtained in a like manner by substituting a nitrogenous base, such as ammonia or a suitable amine, for the inorganic base. Advantageously the neutralization is effected in an organic solvent such as methanol, ethanol, propanol, butanol, amyl acetate and the like. Thus, by treating 4-propyl-L-hygric acid with ammonia, mono-, di-, and trimethylamnies, mono-, di-, and triethylamnies, mono-, di-, and tripropylamines, and the like, the corresponding ammonium salts are obtained. Quaternary ammonium hydroxides, such as tetramethylammonium hydroxide, can be used to prepare the corresponding quaternary ammonium salts.

The acid addition and basic salts disclosed above are useful in upgrading the zwitterion.

The novel compounds of Formula I also form quaternary ammonium salts (Formula II) by reaction with an alkyl halide.

Other quatenary ammonium salts of Formula II are produced by reacting a compound of Formula II wherein A⁻ is a halogen with silver hydroxide and reacting the thus-obtained quatenary ammonium hydroxide (or betaine) with an acid. The anion of the quatenary ammonium salt can be inorganic, for example, chloride, bromide, iodide, nitrate, sulfate, phosphate, thiocyanate, fluosilicate, perchlorate, and the like, or it can be organic, for example, methanesulfonate, p-toluenesulfonate, 1-naphthalene-sulfonate, acetate, benzoate, salicylate, cinnamate, hemisuccinate, lactate, or the like. Examples of alkyl are methyl, ethyl, propyl, butyl, pentyl, hexyl, heptyl, octyl, nonyl, decyl, undecyl, dodecyl, tridecyl, tetradecyl, pentadecyl, hexadecyl, heptadecyl, octadecyl, nonadecyl, eicosyl, and isomeric forms thereof.

The quaternary ammonium salts can be converted to fluosilicic acid salts which are useful as mothproofing agents according to U.S. Patents 1,915,334 and 2,075,359. These fluosilicic acid salts can be formed by metathesis with an inorganic fluosilicate.

The zwitterion form of the invention also forms salts with penicillin. These salts have solubility characteristics which cause them to be useful in the isolation and purification of penicillins, particularly benzylpenicillin. Said salts, like the other salts specified above, can be formed either by neutralization of the free base form of a compound of Formula I with the penicillin free acid, or by a metathetical exchange of the anion of a salt of a compound of Formula I, for example, the chloride ion of a hydrochloride, with the anionic form of the penicillin. The novel compounds of the invention can also be used as buffering agents. For example, the zwitterion can be used as an antacid.

Trans-4-propyl-L-hygric acid (I) can be esterified by treating an equimolar mixture of trans-4-propyl-L-hygric acid and an alcohol, for example, methanol, ethanol, and the like alcohols, with a small amount of a mineral acid, for example, hydrochloric acid, as catalyst. Advantageously, a large excess, that is, 50 to 100 times, of alcohol is used in the reaction. All the esters are useful for upgrading trans-4-propyl-L-hygric acid. Thus, by converting crude trans-4-propyl-L-hygric acid to an ester, isolating the ester and hydrolyzing it, the acid is upgraded. The above esters can also be used as intermediates to form alkyl quaternary ammonium salts as disclosed above.

The higher alkyl quaternary ammonium salts, for example, those wherein the alkyl group is of from 9 to 20 carbon atoms, inclusive, and wherein the carboxyl group is esterified, exhibit valuable wetting and emulsifying properties. These higher alkyl quaternary ammonium salts are useful as detergents and detergent-sanitizers and can be employed to clean and sanitize equipment used in the processing and preparation of foods, for example, fruit, meat, milk, and the like.

The following examples are illustrative of the process and products of the present invention but are not to be construed as limiting.

EXAMPLE 1

*Trans-4-propyl-L-hygric acid hydrochloride*

Two grams of lincomycin hydrochloride were dissolved in 50 ml. of 6 N hydrochloric acid and refluxed for ½ hour. The mixture was evaporated to dryness and the residue was dissolved in 20 ml. of water and extracted twice with 10-ml. portions of chloroform. The aqueous phase was diluted with 60 ml. of water, extracted twice with 20-ml. portions of 1-butanol, and evaporated to dryness in vacuo. The residue was dissolved in 20 ml. of ethanol and the solution was treated with decolorizing carbon and filtered. To the filtrate was added 100 ml. of ether, and the gummy precipitate which formed was removed by filtration. The filtrate was decolorized with carbon, 1000 ml. of ether was added to it, and the solution was cooled in the refrigerator. The crystals of trans-4-propyl-L-hygric hydrochloride which formed were collected by filtration; weight, 0.650 gm. Found by titration were pKa's of 2.4 and 10, rotation $[\alpha]_D^{25}$ —46.5° (c.=2.98, water).

*Analysis.*—Calcd. for $C_9H_{17}NO_2 \cdot HCl \cdot 1/2H_2O$: C, 49.87; H, 8.84; N, 6.46; Cl, 16.36; O, 18.46. Found: C, 49.35; H, 8.55; N, 6.75; Cl, 16.96; O, 18.39. (diff.)

EXAMPLE 2

*Trans-4-propyl-L-hygric acid hydrochloride*

A solution of 4 g. of lincomycin (U.S. Patent 3,086,912) in 20 ml. of hydrazine hydrate (98–100%) was refluxed for a period of 21 hours; excess hydrazine hydrate was then removed in vacuo in a nitrogen atmosphere at steam bath temperature. The residue, a pasty mass of crystals, was cooled, acetonitrile was added and the mixture was stirred until the crystals were suspended. The mixture was then filtered and the filtrate was evaporated to give crude trans-4-propyl-L-hygric acid hydrazide.

A 6-g. sample of crude trans-4-propyl-L-hygric acid hydrazide was refluxed for 3½ hours with 20 ml. of aqueous 6 N hydrochloric acid. The dark brown reaction mixture was thereupon evaporated to dryness in vacuo on a steam bath. The gummy, brown residue was boiled several times with t-butanol until the gum was broken up; the remaining brown precipitate was removed by filtration and discarded. The t-butanol filtrate was treated with a large amount of activated charcoal (Darco G–60), warmed for 30 minutes, and filtered, yielding an orange filtrate which was evaporated to a gummy material in vacuo. The gummy material, which partially crystallized after standing overnight, was dissolved in 20 ml. of hot 2-propanol. To this solution was added three 50-ml. portions of acetone and the mixture was boiled after each addition, a procedure which precipitated an orange-brown gum. Treatment with activated charcoal (Darco G–60) removed the gum and afforded a light yellow filtrate. This filtrate was stirred while 50 ml. of ether was slowly added; crystals started to separate rapidly. After stirring for another 15 minutes the light yellow crystals were collected on a filter, washed with acetone and then with ether and dried; weight, 2.96 g. Recrystallization of the crystals from 30 volumes of hot acetonitrile, using activated charcoal (Darco G–60) gave colorless crystals of trans-4-propyl-L-hygric acid hydrochloride which were air-dried. These crystals had a rotation of $[\alpha]_D^{25}$ —51° (c., 1.205; water).

*Analysis.*—Calcd. for $C_9H_{17}NO_2 \cdot HCl$: C, 52.0; H, 8.73; N, 6.73; O, 15.4; Cl, 17.1. Found: C, 52.17; H, 8.62; N, 6.56; O, 15.02; Cl, 17.14.

EXAMPLE 3

*Trans-4-propyl-L-hygric acid hydrobromide*

In the manner given in Example 1, crude trans-4-propyl-L-hygric acid hydrazide was refluxed with a 6 N hydrobromic acid solution. The resulting material was recovered and purified as in Example 1 to give crystals of trans-4-propyl-L-hygric acid hydrobromide.

EXAMPLE 4

*Trans-4-propyl-L-hygric acid hydrogen sulfate*

In the manner given in Example 1, crude trans-4-propyl-L-hygric acid hydrazide was refluxed with a 4 N sulfuric acid solution for a period of 5 hours and the thus-produced material was recovered and purified as shown in Example 1 to give crystals of trans-4-propyl-L-hygric acid hydrogen sulfate.

EXAMPLE 5

Trans-4-propyl-L-hygric acid

To a solution of 40 g. of crude trans-4-propyl-L-hygric acid hydrochloride in 400 ml. of water was added 60 g. of silver carbonate in portions with continuous stirring. After foaming subsided, the mixture was heated on a steam bath for ½ hour and placed in a refrigerator overnight. To the refrigerated mixture was added 2 g. of decolorizing carbon (Darco G-60) and the mixture was stirred again for ½ hours at room temperature (about 24 to 26° C.) and filtered, yielding a straw-yellow filtrate which was free of chloride ions as shown by a test with silver nitrate. The filtrate was concentrated to dryness and the dry material was redissolved in 200 ml. of ethyl alcohol. The alcoholic solution was again evaporated to dryness and the process was repeated until the dry residue became crystalline. The crystalline material was slurried with 200 ml. of acetone on a steam bath, cooled in a refrigerator, and the crystals were collected on a filter and air-dried; yield, 22.6 g. of trans-4-propyl-L-hygric acid having a melting point of 151–159° C. Repeated crystallizations gave crystals of trans-4-propyl-L-hygric acid melting at 160–162° C., rotation $[\alpha]_D^{25}$ —66° (c.=1.02 in water).

EXAMPLE 6

Trans-4-propyl-L-hygric acid acetate

To an aqueous solution of acetic acid an equimolar amount of 4-propyl-L-hygric acid was added and stirred until completely dissolved. The solution was concentrated on a steam bath until crystallization started. After cooling to room temperature and standing overnight in a refrigerator at 5° C., the crystals of trans-4-propyl-L-hygric acid acetate were collected on a filter, washed with acetone and with ether, and air-dried.

EXAMPLE 7

Trans-4-proyl-L-hygric acid lactate

In the manner given in Example 6, an aqueous solution of lactic acid was reacted with an equimolar amount of trans-4-propyl-L-hygric acid to give trans-4-propyl-L-hygric acid lactate.

EXAMPLE 8

Trans-4-proyl-L-hygric acid hydrogen succinate

In the manner given in Example 6, trans-4-propyl-L-hygric acid was added to an aqueous solution of succinic acid using an equimolar amount of succinic acid with respect to the propylhygric acid. In this manner trans-4-propyl-L-hygric acid hydrogen succinate was obtained.

In the manner given in Example 2, treating trans-4-propyl-L-hygric acid hydrazide with aqueous solutions of other mineral acids results in the production of mineral acid salts of trans-4-propyl-L-hygric acid such as the hydrobromide, and like salts.

In the manner given in Example 6, other organic acid salts of trans-4-propyl-L-hygric acid are prepared by reacting equimolar amounts of trans-4-propyl-L-hygric acid and the selected organic acid in aqueous solution or, if necessary, in alcoholic solution. Representative salts of 4-propyl-L-hygric acid thus obtained include the acid tartrate, valerate, isovalerate, propionate, butyrate, hexanoate, octanoate, cyclopentanepropionate, salicylate, maleate, malate, methanesulfonate, cyclohexylsulfamate, and the like.

EXAMPLE 9

Methyl ester of trans-4-propyl-L-hygric acid

Twenty grams (0.11 mole) of trans-4-proyl-L-hygric acid, prepared as in Example 1, was added to 200 ml. of anhydrous methanol and dry hydrogen chloride was bubbled through for 1 hour. After standing at room temperature overnight the solvent was removed under reduced pressure. The residual oil was again dissolved in 200 ml. of methanol which was also removed under reduced pressure. The oil was dissolved in 150 ml. of water, treated with activated carbon and filtered. To the filtrate was added, carefully, solid potassium carbonate (40–50 gm.). A colorless oil separated, and the mixture was extracted twice with 100–ml. portions of ether. Additional potassium carbonate was added to the aqueous phase, which was again extracted with 100 ml. of ether. The ether extracts were combined, dried over anhydrous sodium sulfate, filtered and evaporated under reduced pressure. The residual pale yellow oil was the methyl ester of trans-4-propyl-L-hygric acid; yield 18.6 gm.

Analysis.—Calcd. for $C_{10}H_{19}NO_2$: C, 64.83; H, 10.34; N, 7.56. Found: C, 64.15; H, 10.43; N, 7.51.

By substituting the anhydrous methanol in the above process by ethanol, propanol, butanol, amyl alcohol, hexanol, heptanol, and octanol, there are obtained the corresponding lower-alkyl esters of trans-4-propyl-L-hygric acid.

EXAMPLE 10

Methiodide of trans-4-propyl-L-hygric acid methyl ester

To 18.5 gm. (0.1 mole) of the methyl ester of trans-4-propyl-L-hygric acid, prepared as in Example 9, was added 21.3 gm. (0.15 mole) of methyl iodide. After standing at room temperature overnight, the reaction mixture was dissolved in 200 ml. of methanol, treated with decolorizing carbon, and evaporated to dryness under reduced pressure. The residue crystallized on standing and was recrystallized from ethyl acetate-ethanol (15:1), from which 20 gm. of white crystals of the methiodide of trans-4-propyl-L-hygric acid methyl ester were obtained. The mother liquor was evaporated to dryness and the residue was recrystallized to give an additional 3.7 gm. of the methiodide of trans-4-propyl-L-hygric acid methyl ester.

Analysis.—Calcd. for $C_{11}H_{22}INO_2$: C, 40.38; H, 6.78; N, 4.28; I, 38.79. Found: C, 40.58; H, 7.02; N, 4.61; I, 38.95.

By substituting the methyl iodide in the above process by other alkyl halides the corresponding quaternary ammonium salts are obtained, e.g., the ethyl iodide, propyl iodide, butyl iodide, hexyl iodide, isopropyl iodide, sec-butyl iodide, ethyl bromide, butyl bromide and the like.

EXAMPLE 11

Trans-4-propyl-L-stachydrine

Three grams of trans-4-propyl-L-hygric acid hydrochloride were dissolved in 20 ml. of methanol and to this solution was added 20 g. of silver oxide and 10 ml. of methyl iodide. The vigorous reaction which ensued was modified by cooling, allowing the mixture to reflux gently. After the initial reaction had abated, 20 ml. of methanol was added and 5 ml. of methyl iodide. After stirring until the exothermic reaction was over, the salts were filtered and washed with methanol. The light yellow filtrate was evaporated to dryness in vacuo and the residue was dissolved in 50 ml. of acetone and seeded with a small amount of crystals preformed in acetone and ethyl acetate. The resulting crystals, which were extremely hygroscopic, were collected, washed with acetone and with ether, and dried in vacuo at 50° C. The rapidity with which these crystals of 4-propylstachydrine took up moisture, made analysis difficult. Trans-4-propyl-L-stachydrine had a rotation, $[\alpha]_D^{25}$—29° (c.=0.9082, water), and an analysis as follows:

Analysis. Calcd. for $C_{10}H_{19}NO_2 \cdot 1/2 H_2O$: C, 64.8; H, 10.3; N, 7.20; $H_2O$, 4.64. Found: C, 63.91; H, 10.15; N, 7.06; $H_2O$, 4.94.

In the same manner shown in Example 11, other betaines can be produced by reacting a mineral acid salt of trans-4-propyl-L-hygric acid with an alkyl halide such as ethyl, propyl, isopropyl or butyl iodide or bromide in the presence of silver oxide. Representative compounds thus produced have the formula:

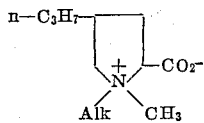

wherein Alk represents an alkyl radical such as ethyl, propyl, isopropyl, butyl, pentyl, hexyl, heptyl, octyl, decyl, undecyl, lauryl, pentadecyl, hexadecyl, octadecyl, eicosyl and the like.

EXAMPLE 12

Isomerization of propylhygric acid

Nine grams of propylhygric acid hydrochloride and 350 ml. of aqueous barium hydroxide (saturated at 40° C.) were heated in a sealed tube at 160° C. in an oil bath, for a period of 48 hours. The tube was then cooled, opened and an equal volume of water was added. The aqueous mixture was filtered and the filtrate adjusted to pH 7 with 2 N aqueous sulfuric acid. The reaction mixture containing barium sulfate was then filtered, the precipitate washed, the washing and filtrate combined, treated with a small quantity of sulfuric acid until no further precipitation of barium sulfate was noted and the mixture was refiltered. The filtrate was freeze-dried and the residue thus obtained, which was an isomerized propylhygric acid hydrochloride of rotation $[\alpha]_D^{25}$ —37° in water, was redissolved in water and stirred while adding silver carbonate until neutral. The thus-produced silver chloride and excess silver carbonate was removed by filtration. The precipitates were washed and the washings added to the filtrate which was then freeze-dried to give a mixture of isomeric 4-propylhygric acids. This material could be recrystallized from acetonitrile to give isomeric propylhygric acids (6.1 g. yield) in the form of colorless white crystals.

In the manner given in Example 12, trans-4-propyl-L-hygric acid can be isomerized by heating with other inorganic bases such as sodium hydroxide, potassium hydroxide, lithium hydroxide, hydrazine hydrate, or the like. The isomeric 4-propylhygric acids can be converted to esters in the same manner as shown in Example 9 for trans-4-propyl-L-hygric acid. The esters thus obtained from the isomer of trans-4-propyl-L-hygric acid can furthermore be quaternized in the same manner as given in Example 10 to give, for example, the methiodide of a mixture of isomeric 4-propylhygric acid methyl esters. In the same manner as the methiodide is obtained, other N-alkyl halide derivatives can be made, such as the ethiodide, propyl iodide, hexyl iodide, decyl iodide, dodecyl iodide, of isomerized 4-propylhygric acid methyl ester, which are useful as disinfectants, as active agents in electrocardiographic jellies, wetting agents and for the emulsifying properties. A suitable composition of an electrocardiographic jelly can be prepared as follows:

| | Parts |
|---|---|
| Glycerol | 5 |
| Starch | 10 |
| Quaternary ammonium salts | 60 |
| Water | 100 |

The jelly is prepared by mixing the starch, glycerol and water and then adding the selected quaternary ammonium salts, such as the dodecyl iodide of isomeric 4-propylhygric acid methyl ester.

We claim:
1. A compound selected from the group consisting of 4-propylhygric acid having a rotation $[\alpha]_D^{25}$ —66°

(c.=1.02 in water)

and lower alkyl esters thereof wherein alkyl has from 1 to 8 carbon atoms, inclusive.
2. Crystalline essentially pure trans-4-propyl-L-hygric acid.
3. Trans-4-propyl-L-hygric acid.
4. Methyl ester of trans-4-propyl-L-hygric acid.
5. Trans-4-propyl-L-hygric acid hydrochloride.
6. Trans-4-propyl-L-hygric acid acetate.
7. Methiodide of trans-4-propyl-L-hygric acid methyl ester.
8. Trans-4-propyl-L-stachydrine.

References Cited by the Examiner

Fieser et al.: Organic Chemistry, 1956 C. 6, pages 226, 227, 242, 274 and 275.
King, J. Chem. Soc., 1941, pages 337–9.
Wagner et al.: Synthetic Organic Chemistry, pages 480 668.

ALEX MAZEL, *Primary Examiner.*

HENRY JILES, *Examiner.*

J. A. NARCAVAGE, *Assistant Examiner.*